Aug. 3, 1954

H. RIVERS 2,685,117

APPARATUS FOR REMOVING FORMED BRICK FROM BRICK PRESSING MACHINES

Filed Feb. 27, 1952

INVENTOR.
Heyward Rivers
BY
J.P. Moran
ATTORNEY

Aug. 3, 1954

H. RIVERS 2,685,117

APPARATUS FOR REMOVING FORMED BRICK FROM BRICK PRESSING MACHINES

Filed Feb. 27, 1952

INVENTOR.
BY *Heyward Rivers*
*J. P. Moran*
ATTORNEY

Patented Aug. 3, 1954

2,685,117

UNITED STATES PATENT OFFICE 2,685,117

APPARATUS FOR REMOVING FORMED BRICK FROM BRICK PRESSING MACHINES

Heyward Rivers, Augusta, Ga., assignor to The Babcock & Wilcox Company, New York, N. Y., a corporation of New Jersey Application February 27, 1952, Serial No. 273,644

14 Claims. (Cl. 25—45)

This invention relates to the manufacture of brick and, more particularly, to apparatus for removing formed brick, having a surface or surfaces other than flat, ejected from the mold cavity of dry press brick manufacturing machinery.

In brick manufacturing apparatus of the type to which the present invention is directed, a hopper is provided to contain a supply of relatively coarse mix used to make the bricks, and which may comprise clay of a certain type or mixtures of clays with or without addition of other material. Associated with the hopper is a mold cavity for receiving a charge of mix from the hopper, and die means are operatively associated with the mold cavity, to compress the mix therein to form a brick and to eject the formed brick from the mold cavity.

The cavity is charged with mix by a charger which is reciprocable between a first position in which it receives mix from the hopper and a second position in which it discharges mix into the mold cavity. This charger, in its forward or mold cavity filling stroke, is adapted to remove a previously formed brick which has been ejected from the mold cavity and position the brick on a receiving surface forwardly of the mold cavity.

When the charger is in the return position adjacent the supply hopper, the aforementioned die means operate to compress the mix into a brick, and to eject the brick from the mold cavity. The apparatus is usually so arranged that the mold cavity and the hopper extend vertically and the charger reciprocates in a horizontal plane. The die means include a lower die which acts as a bottom closure for the mold cavity, and an upper die reciprocable into and out of the cavity. The lower die is generally biased upwardly under a controlled spring pressure, whereas the upper die is operated by a power device, preferably through a toggle mechanism. The apparatus is usually driven from an external power source, such as an electric motor, and timing means are provided, preferably of a mechanical nature, so that the operation takes place in the desired predetermined sequence.

The charger removes the ejected formed brick by sliding it forwardly from the upper surface of the lower die onto the horizontal receiving surface or table. However, such automatic removal of the brick is limited to bricks having flat surfaces formed by the dies, or at least one flat surface formed by the lower die.

When the apparatus is used to form bricks having other than flat surfaces, by contouring the die faces to form contoured faces on the bricks, automatic sliding of the ejected brick onto the receiving table by the charger can not be utilized as the shaped contours of the ejected brick would be destroyed by the sliding action. Hence, particularly where the brick face formed by the lower die is other than flat, it has been necessary to manually lift and remove each brick as it is ejected by the lower die. This has involved additional labor cost in the brick manufacture, increasing the cost of the finished bricks.

The present invention is directed to an automatically operated brick gripping means carried by the charger and projecting forwardly therefrom. Mechanism is provided, and including connections between the charger and the gripping means, constructed and arranged to operate the gripping means, during forward movement of the charger, to clamp an ejected brick and lift the latter from the lower die. As the charger continues its forward movement, the brick is carried onto the receiving table, whereupon the mechanism releases the gripping means from the brick in advance of the return stroke of the charger.

More specifically, the gripping means comprises a pair of horizontally disposed tongs mounted for vertical movement on the sides of the charger and swingable to open and closed position in a horizontal plane. Pins on the charger sides engage in generally longitudinal cam slots in the tongs, and the rear ends of the tongs are connected by toggle links to a connecting plate secured to the charger moving arms. The tongs carry abutments engageable by springs fixed to the charger support surface on either side of the tongs.

As the charger is advanced, the tong abutments are releasably engaged by the springs just as the tongs are aligned with the ejected brick. With the tong forward movement thus arrested, forward movement of the charger causes the toggle links to swing the tongs to clamp on the brick, and then the pins riding in the cam slots lift the forward end of the charger. The charger then positively moves the tongs forwardly, the abutments overriding the springs.

When the charger begins to move rearwardly, the springs engage the tong abutments to hold the tongs against rearward movement. The action of the cam slots and pins lowers the tongs to place the brick on the table, and the toggles then swing the tongs to the open position. The charger then positively moves the tongs rearwardly, overriding the releasable spring stops.

For an understanding of the invention principles, reference is made to the following description of a typical embodiment thereof as illustrated in the accompanying drawings.

Figure 1:
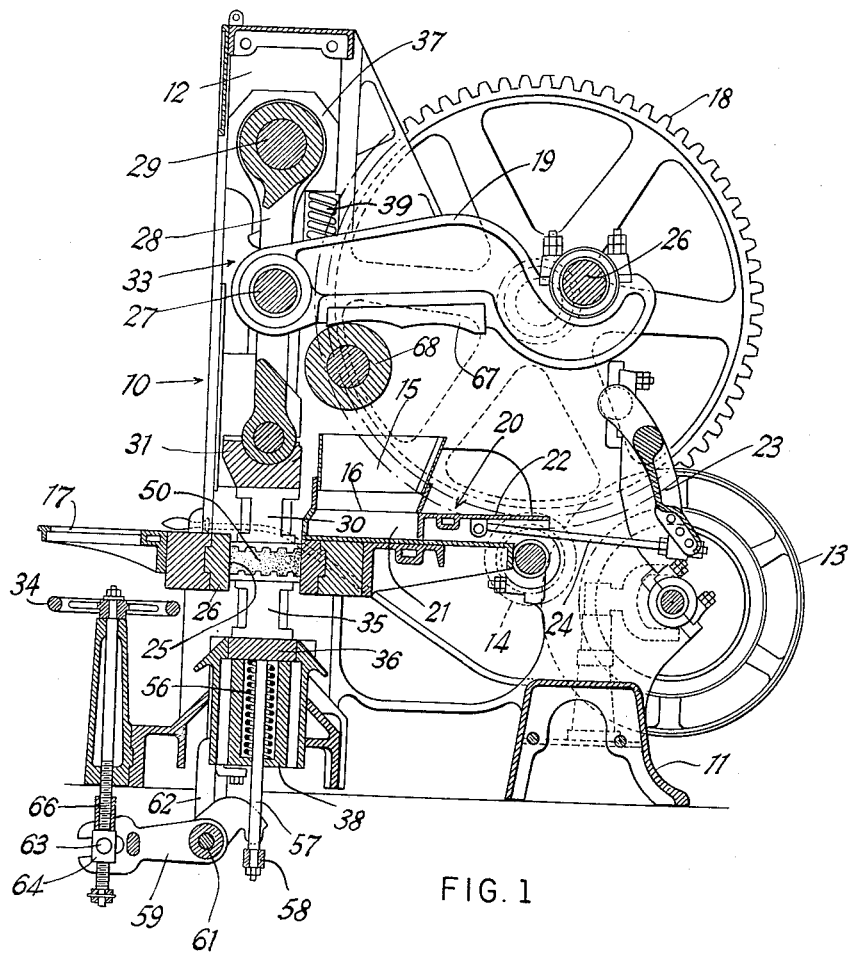
Fig. 1 is a vertical sectional view through brick forming and pressing apparatus of the type to which the present invention is applicable.

In order that the application of the invention to brick manufacturing apparatus will be readily understood, Fig. 1 illustrates the main elements of a well known type of machine for forming and pressing brick. The machine illustrated in Fig. 1 is known to the art as a "Boyd brick press." In this figure, the machine is illustrated without the invention improvements, in order to simplify the disclosure, and the improvements have been shown in Figs. 2 through 9, with only the directly associated elements of the machine of Fig. 1, in order to afford a clearer understanding of the invention.

Referring to Fig. 1, the brick manufacturing apparatus 10 includes a supporting frame generally indicated at 11 on which is mounted a hopper 15 in back of an upright or die guiding portion 12 of frame 11. Hopper 15 is arranged to contain a supply of relatively coarse mesh mix for pressing into bricks, and acts as a reservoir which may be kept filled with mix by means of a suitable conduit or chute leading to a storage bin (not shown) on an overhead support, for example. Hopper 15 has an open bottom 16 which is vertically alignable with the mix receiving chamber 21 of a charger generally indicated at 20. Charger 20, in Fig. 1, is in an intermediate retracted position.

Charger 20 is arranged to reciprocate in a substantially horizontal plane so that chamber 21 is movable between a position vertically aligned with hopper 15 and a position vertically aligned with a mold cavity 25. In the first position, chamber 21 is charged with mix from hopper 15 and, as charger 20 moves towards mold cavity 25, a horizontal upper plate 22 on the charger seals the open bottom 16 of hopper 15.

The mold cavity 25 is aligned with the vertical support 12 which acts as supporting and guiding means for the upper die means 30. Cavity 25 may have removable liners 26 so that the shape of the cavity may be changed in accordance with the desired shape of the brick.

Associated with the cavity 25 is a lower die means 35 acting as a bottom closure for cavity 25. Dies 30 and 35 are detachably secured to support blocks such as 31 and 36, whereby the dies may be changed and other dies substituted therefor when the shape of the mold cavity is changed. In the operation of the machine, the dies 30 and 35 compress the mix discharged into cavity 25 from chamber 21, after which lower die 35 moves upwardly to eject the formed brick. On the next forward stroke of charger 20, the forward edge of the latter, or a suitable pusher bar secured to the forward edge, pushes the formed brick forwardly onto a table 17 from which the formed brick may be removed to a suitable conveyor for further processing.

The operation of the dies 30 and 35, and of the charger 20, is effected in timed relation so that, when the dies are withdrawn, the charger fills the mold cavity and, as the charger withdraws to a position aligning chamber 21 with hopper 15, the dies compress the mix in the mold cavity. The dies then release, with lower die 35 moving upwardly to eject the formed brick.

As the operation of the well known apparatus shown in Fig. 1 is familiar to those skilled in the art, only a brief description of the operation will be necessary. The brick forming and pressing machine is driven, from a suitable electric motor, internal combustion engine, or other power source, which drives a pulley 13. Through suitable clutches and gearing, pulley 13 drives a pinion 14 which rotates a massive gear 18 in a clockwise direction. Gear 18 carries a crank pin 26 connected to the pivot 27 of a toggle, generally indicated at 33, by a beam 19. The upper arm 28 of the toggle is oscillatable on a pin 29 connected to the upper ends of sidearms 37. The sidearms are vertically reciprocable in frame portion 12 and their lower ends are connected to crosshead 38. An equalizing spring 39 is compressed by downward movement of sidearms 37.

Crosshead 38 has a recess in which is seated a spring 56 biasing upwardly block 36 to which is secured lower die 35. A saddle rod 57, attached to block 36, is reciprocable through crosshead 38, and its lower end carries a saddle 58 which is engageable by the inner ends of a dual lever 59 oscillatable on a pin 61 mounted in a bracket 62 attached to crosshead 38. The forked outer ends of lever 59 engage a pin 63 on a nut 64 which is vertically adjustable along a threaded shaft 66 operated by a hand wheel 34. These latter elements comprise a pressure adjusting mechanism which has a fulcrum on pin 63. A cammed lifting shoe 67 secured on the lower surface of beam 19 is cooperable with a lifting roller 68 mounted on frame 11.

In Fig. 1, the dies are shown substantially in their maximum pressure position, and the engagement of shoe 67 with roller 68 has lifted the side bars 37 and attached crosshead 38. Beam 19 is about to move outwardly to release the toggle 33. Due to the upward movement of crosshead 37, lever 59 has swung upwardly about pin 63, the relations involved being such that the inner ends of the lever have disengaged, and are substantially spaced from, saddle 58. The pressure of upper die 30 holds lower die 35 with its mounting block 36 against crosshead 38 and compressing spring 56.

As beam 19 moves outwardly to release the toggle mechanism, and thus withdraw upper die 30, the shoe 67 riding outwardly over roller 68 causes the outer end of beam 19 to move upwardly raising side arms 37 and crosshead 38 even more. This increases the spacing of the inner ends of lever 59 from saddle 58 so that, as the upper die 30 clears mold cavity 25 and moves further upwardly, spring 56 biases lower die 35 to move upwardly. The movement of lower die 35 continues until the pressed brick 50 is lifted level with table 17. Later, the action of bars 37 lowers crosshead 38 to engage the ends of lever 59 with saddle 58 to pull die 35 down, in conjunction with downward movement of crosshead 38, to provide a filling space in cavity 25.

Charger 20 is reciprocated horizontally by an arm 23 connected to the hopper by links 24. The reciprocating mechanism 23, 24 for the charger is coordinated with the die operating mechanism in order to provide the aforementioned cycle of operation. When die 30 is clear of the mold and die 35 has ejected brick 50, charger 20, in its outward stroke, is adapted to move brick 50 onto table 17.

With the foregoing general description of the operation of a typical dry press brick manufacturing machine, the operation of the invention will be best understood by reference to Figs. 2 through 9. In these latter figures, only the charger 20, mold cavity 25, die 35 and table 17 have been shown, as these are the elements of the machine to which the invention is applied, the other parts of the machine remaining unchanged.

In the manufacture of brick wherein at least the surface formed by lower die 35 is flat or smooth, the formed brick 50, ejected by action of die 35, is moved onto table 17 by charger 20 during the forward stroke of the latter. However, when the face of die 35, or the faces of both dies 30 and 35, are contoured to press a predetermined configuration into the die-engaged faces of the brick, sliding removal of the formed brick onto table 17 by charger 20 is either impossible or would destroy the configurations on the lower face of the brick. Hence, when the press is used to form contoured face brick, the ejected brick is manually lifted and removed to table 17. This not only increases the labor cost but also presents a safety hazard to the helper removing the brick. The present invention relates to simple apparatus for automatically clamping the ejected brick, lifting it, moving the brick forwardly toward table 17, lowering the brick onto the table, and then releasing the brick, all in timed relation with the operating cycle of charger 20 and dies 30, 35.

Figure 2:
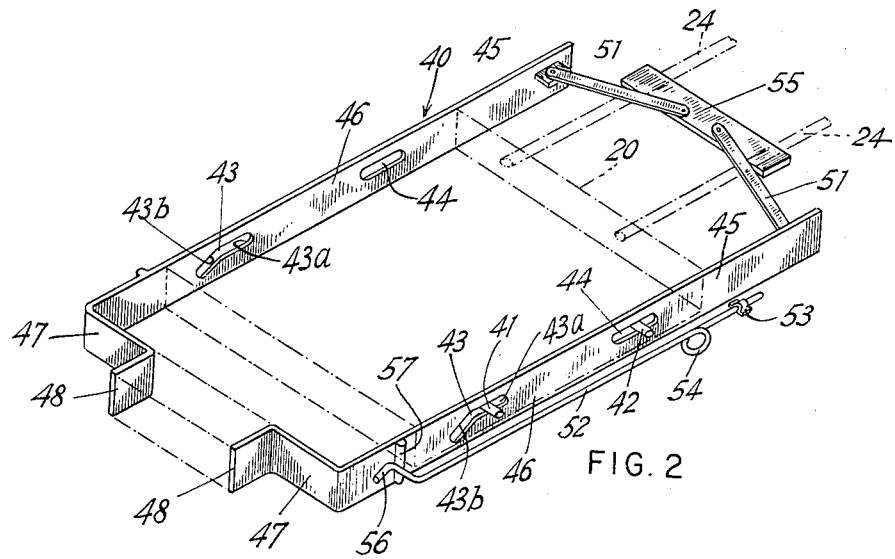
Figs. 2 and 3 are isometric views illustrating two relative positions of the tongs and the charger, the latter being shown in broken outline, and non-related parts of the apparatus of Fig. 1 being omitted for clarity.
Figure 3:
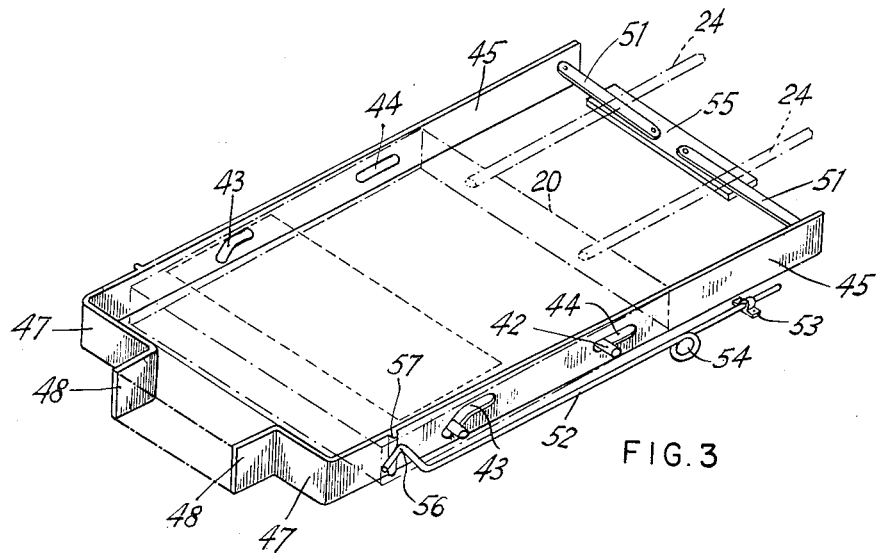

Referring to Figs. 2 and 3, the brick gripping and carrying means comprises a pair of tongs, generally indicated at 40, mounted for relative horizontal and vertical movement on charger 20. For this purpose, the sides of charger 20 are each provided with a pair of longitudinally spaced, outwardly projecting pins 41, 42, respectively engaged in forward slots 43 and rearward slots 44 of arms 45 of tongs 40. Slots 43 are cam slots including a horizontal portion 43a and a forwardly and downwardly sloping portion 43b. Slots 44 extend horizontally.

Each arm 45 includes an elongated slotted portion 46 lying against a side of charger 20 and having its lower edge normally riding along the horizontal supporting surface for the charger. The forward end 47 of each arm 45 is bent inwardly at right angles to portion 46 to lie in front of charger 20, and each forward end is then bent outwardly to provide a brick gripping surface 48 parallel to the sides of charger 20 and to opposed vertical faces of the pressed brick. The lateral spacing of surfaces 48 is substantially equal to the lateral thickness of the pressed brick.

Toggle links 51 pivotally connect the rear ends of arms 45 to a plate 55 fixedly secured to arms 24 connected to charger 20. The forward portions of arm portions 46 are biased toward the sides of charger 20 by a pair of springs 52 each having its rear end secured to surface by a clamp 53. An intermediate coil 54 in each spring 52 biases the free end of the spring toward the adjacent arm 45. The free end of each spring 52 is inwardly and then reversely bent to form an ear 56 riding against an arm 45. In a manner to be described, ears 56 cooperate with abutments 57 on the arms to periodically restrain longitudinal movement of tongs 40 during movement of charger 20. To clarify the disclosure, only one spring 52 is shown in Figs. 2 and 3.

Fig. 2 illustrates the apparatus at the point in the cycle at which surfaces 48 of arms 45 are adjacent the sides of the brick and tongs 40 is being moved to grip the brick. During the rearward movement of charger 20, tongs 40 have been held in a forwardly extended position, relative to the charger, by pins 41, 42 engaging the rear ends of the respective slots. Also, the tongs are held open by virtue of the rearwardly extended position of plate 55 (fixed relative to charger 20) relative to tongs 40, thus actuating links 51 to draw the rear ends of arms 45 inwardly to spread surfaces 48 apart. As charger 20 moves forwardly, spring ears 56 engage abutments 57, temporarily arresting forward movement of tongs 40 so that pins 41, 42 move forwardly in slot portions 43a and slots 44. The simultaneously occurring relatively forward movement of plate 55 tends to straighten links 51. This swings arms 45 to move surfaces 48 toward the brick faces.

Fig. 3 illustrates the apparatus at the point of lowering and releasing the brick on table 17. The ears 56, now engaging behind abutments 57, temporarily restrain rearward movement of tongs 40, so that pins 41 ride along cam or sloped slot portions 43b tending to pivot the tongs about pins 42 to swing surfaces 48 downwardly. At the same time, the relative rearward movement of plate 55 pulls the rear ends of arms 45 toward each other to spread surfaces 48.

Figure 4:
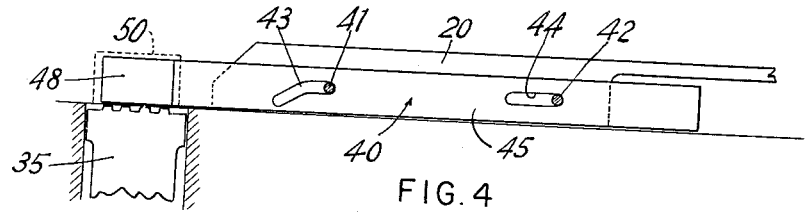
Figs. 4 through 9 are partial elevation and sectional views of the charger, tongs, and lower die illustrating successive steps in the removal of a formed, ejected brick.

The brick gripping, lifting, carrying, lowering and releasing cycle will be best understood by reference to the cycle sequence illustrated in Figs. 4 through 9, with collateral reference to Figs. 2 and 3. Fig. 4 shows the charger and tongs at the start of the forward stroke of the charger, a brick 50 having been ejected and the hopper of the charger having been refilled with mix. Pins 41 and 42 are at the rear ends of their slots and the surfaces 48 are aligned with the brick faces and in their lowermost position.

Figure 5:
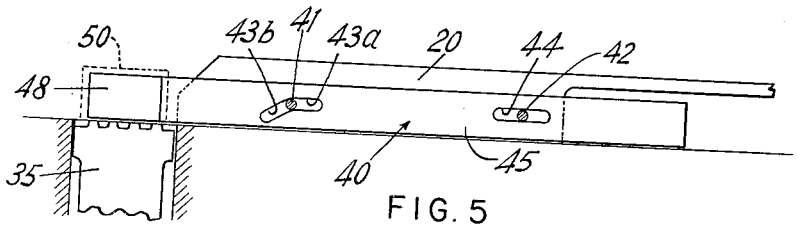
Figure 6:
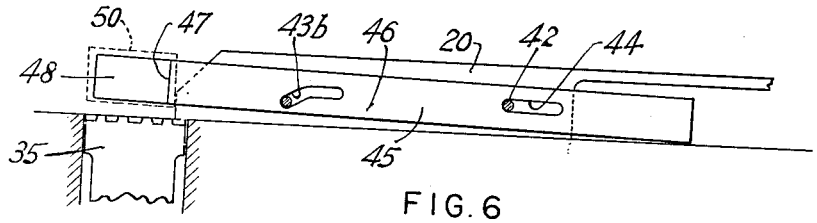
Figure 7:
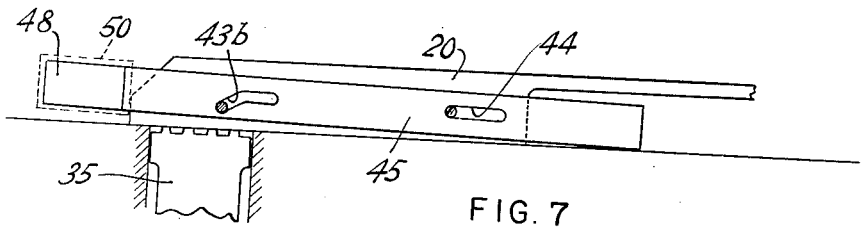
Figure 8:
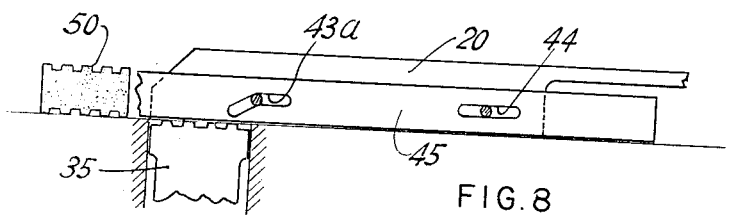
Figure 9:
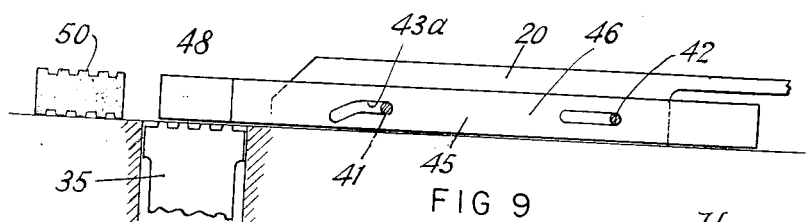

As charger 20 moves forwardly, spring ears 56 engage the forward sides of abutments 57 (Fig. 2) restraining forward movement of tongs 40. As pin 41 moves along horizontal slot portion 43a and pin 42 along horizontal slot 44, the toggle 51, 55 swings the rear ends of arms 45 outwardly to clamp surfaces 48 on opposed brick faces. This operation is substantially completed as pins 41 reach the junction of slot portions 43a and 43b, as shown in Fig. 5.

As charger 20 continues its forward movement, pins 41 ride forwardly along slot portions 43b, swinging arms 45 clockwise (Fig. 6) about pins 42 to raise surfaces 48 clamped onto brick 50. When pins 41 engage the forward ends of slots 43, tongs 40 are again moved forwardly, overcoming the restraint of springs 52. Ears 56 ride over abutments 57. The movement continues until the position of Fig. 7 in which the charger hopper is aligned with the mold cavity and brick 50 is poised above table 17.

The charger now begins its rearward stroke, and spring ears 56 engage the rear sides of abutments 57 to temporarily restrain rearward movement of the tongs 40 (Fig. 3). Pins 41 ride rearwardly along sloping slot portions 43b to swing arms 45 counter-clockwise (Fig. 8) to lower brick 50 onto table 17. At the same time, the toggle 51, 55 begins to open the tongs to release the brick. This opening movement continues as pins 41 ride along horizontal slot portions 43a. As the pins 41 engage the rear ends of slots 43, the tongs are moved rearwardly (Fig. 9) to the position of Fig. 1 and the cycle is repeated.

The invention thus provides a simple attachment whereby a brick is gripped, lifted, removed, lowered and released, all in cyclically timed relation with the brick pressing and forming operation. Manual removal of ejected bricks having lower surfaces other than flat is obviated, thus reducing the manufacturing expense.

While a specific embodiment of the invention has been shown and described in detail to illustrate the application of the invention principles, it will be understood that the invention may be otherwise embodied without departing from such principles.

I claim:

1. In apparatus for manufacturing pressed brick of the type including; a charger horizontally reciprocable between a rearward position in which it receives mix from a hopper and a forward position, and discharging mix into a vertically disposed mold cavity during advance toward such forward position, and a formed-brick receiving surface in the line of movement of the charger forwardly of the mold cavity; the combination of brick gripping means carried by said charger and projecting forwardly therefrom; said brick gripping means being vertically movable relative to said charger; and mechanism, including connections between said charger and said gripping means, constructed and arranged to operate, during forward movement of said charger to clamp said gripping means onto a formed brick and then to lift said gripping means to raise the brick to carry the latter onto said receiving surface during continued forward movement of said charger.

2. In apparatus for manufacturing pressed brick of the type including; a charger horizontally reciprocable between a rearward position in which it receives mix from a hopper and a forward position, and discharging mix into a vertically disposed mold cavity during advance toward such forward position, and a formed-brick receiving surface in the line of movement of the charger forwardly of the mold cavity; the combination of brick gripping means carried by said charger and projecting forwardly therefrom; said brick gripping means being vertically and longitudinally movable relative to said charger; a lost motion connection between said charger and said gripping means; and releasable latch means arranged to engage said gripping means, during longitudinal movement of said charger, to temporarily arrest longitudinal motion of said gripping means; said connection being constructed and arranged to operate said gripping means, responsive to such arrested motion of the latter, to clamp onto a formed brick and to move upward relative to said charger to lift the brick; said latch means being releasable responsive to continued movement of said charger to provide for said gripping means carrying the brick onto said receiving surface.

3. In apparatus for manufacturing pressed brick of the type including; a charger horizontally reciprocable between a rearward position in which it receives mix from said hopper and a forward position, and discharging mix into a vertically disposed mold cavity during advance toward such forward position, and a formed-brick receiving surface in the line of movement of the charger forwardly of the mold cavity; the combination of brick gripping means carried by said charger and projecting forwardly therefrom; said brick gripping means being vertically and longitudinally movable relative to said charger; a lost motion connection between said charger and said gripping means; and releasable latch means arranged to engage said gripping means, during forward movement of said charger, to temporarily arrest corresponding motion of said gripping means; said connection being constructed and arranged to operate said gripping means, responsive to such arrested motion of the latter, to clamp onto a formed brick and to move upward relative to said charger to lift the brick; said latch means being releasable responsive to continued forward movement of said charger to provide for said gripping means carrying the brick onto said receiving surface.

4. In apparatus for manufacturing pressed brick of the type including; a charger horizontally reciprocable between a rearward position in which it receives mix from a hopper and a forward position, and discharging mix into a vertically disposed mold cavity during advance toward such forward position, and a formed-brick receiving surface in the line of movement of the charger forwardly of the mold cavity; the combination of brick gripping means carried by said charger and projecting forwardly therefrom; said brick gripping means being vertically and longitudinally movable relative to said charger; a lost motion connection between said charger and said gripping means; and releasable latch means arranged to engage said gripping means, during forward and reverse movement of said charger, to temporarily arrest corresponding motion of said gripping means; said connection being constructed and arranged to operate said gripping means, responsive to such arrested motion of the latter during forward movement of said charger, to clamp onto a formed brick and to move upward relative to said charger to lift the brick; said latch means being releasable responsive to continued forward movement of said charger to provide for said gripping means carrying the brick onto said receiving surface; said connection operating said gripping means, responsive to arrested motion of the latter during reverse movement of said charger, to move downwardly relative to said charger and to release the brick; said latch means being releasable responsive to continued reverse movement of said charger.

5. In apparatus for manufacturing pressed brick of the type including; a charger horizontally reciprocable between a rearward position in which it receives mix from a hopper and a forward position, and discharging mix into a vertically disposed mold cavity during advance toward such forward position, and a formed-brick receiving surface in the line of movement of the charger forwardly of the mold cavity; the combination of brick gripping tongs including a pair of arms each extending along a side of said charger and projecting forwardly therefrom, each of said arms having a longitudinally extending cam slot therein; pins projecting from the sides of the charger and each engaged in a cam slot; means biasing the forward portions of said arms to engage the charger; link means connecting the rear ends of the arms to means fixed to said charger; and releasable latch means arranged to engage said tongs, during longitudinal movement of said charger, to temporarily arrest longitudinal motion of said tongs; said link means, responsive to such arrested movement of said tongs spreading the rear ends of said arms to clamp the projecting forward arm portions onto a formed brick, and said pins moving along said cam slots to lift such forward arm portions; said latch means being releasable responsive to continued movement of said charger to provide for said tongs carrying the brick onto said receiving surface.

6. In apparatus for manufacturing pressed brick of the type including; a charger horizontally reciprocable between a rearward position in which it receives mix from a hopper and a forward position, and discharging mix into a vertically disposed mold cavity during advance toward such forward position, and a formed-brick receiving surface in the line of movement of the charger forwardly of the mold cavity; the combination of brick gripping tongs including a pair of arms each extending along a side of said charger and projecting forwardly therefrom, each of said arms having a longitudinally extending cam slot therein; pins projecting from the sides of the charger and each engaged in a cam slot; means biasing the forward portions of said arms to engage the charger; link means connecting the rear ends of the arms to means fixed to said charger; and releasable latch means arranged to engage said tongs, during forward movement of said charger, to temporarily arrest corresponding motion of said tongs; said link means, responsive to such arrested movement of said tongs, spreading the rear ends of said arms to clamp the projecting forward arm portions onto a formed brick, and said pins moving along said cam slots to lift such forward arm portions; said latch means being releasable responsive to continued forward movement of said charger to provide for said tongs carrying the brick onto said receiving surface.

7. In apparatus for manufacturing pressed brick of the type including; a charger horizontally reciprocable between a rearward position in which it receives mix from a hopper and a forward position, and discharging mix into a vertically disposed mold cavity during advance toward such forward position, and a formed-brick receiving surface in the line of movement of the charger forwardly of the mold cavity; the combination of brick gripping tongs including a pair of arms each extending along a side of said charger and projecting forwardly therefrom, each of said arms having a longitudinally extending cam slot therein; pins projecting from the sides of the charger and each engaged in a cam slot; means biasing the forward portions of said arms to engage the charger; link means connecting the rear ends of the arms to means fixed to said charger; and releasable latch means arranged to engage said tongs, during forward and reverse movement of said charger, to temporarily arrest corresponding motion of said tongs; said link means, responsive to such arrested movement of said tongs during forward movement of said charger, spreading the rear ends of said arms to clamp the projecting forward arm portions onto a formed brick, and said pins moving along said cam slots to lift such forward arm portions; said latch means being releasable responsive to continued forward movement of said charger to provide for said tongs carrying the brick onto said receiving surface; said pins, responsive to such arrested movement of said tongs during reverse movement of said charger, riding along said cam slots to lower such forward arm portions, and said link means converging the rear ends of said arms to spread the projecting forward portions thereof to release the brick; said latch means being releasable responsive to continued reverse movement of said charger.

8. In apparatus for manufacturing pressed brick of the type including; a charger horizontally reciprocable between a rearward position in which it receives mix from a hopper and a forward position, and discharging mix into a vertically disposed mold cavity during advance toward such forward position, and a formed-brick receiving surface in the line of movement of the charger forwardly of the mold cavity; the combination of brick gripping tongs including a pair of arms each extending along a side of said charger and projecting forwardly therefrom, each of said arms having a longitudinally extending cam slot therein; pins projecting from the sides of the charger and each engaged in a cam slot; means biasing the forward portions of said arms to engage the charger; toggle links connecting the rear ends of the arms to means fixed to said charger; and releasable latch means arranged to engage said tongs, during longitudinal movement of said charger, to temporarily arrest longitudinal motion of said tongs; said toggle links, responsive to such arrested movement of said tongs, spreading the rear ends of said arms to clamp the projecting forward arm portions onto a formed brick, and said pins moving along said cam slots to lift such forward arm portions; said latch means being releasable responsive to continued movement of said charger to provide for said tongs carrying the brick onto said receiving surface.

9. In apparatus for manufacturing pressed brick of the type including; a charger horizontally reciprocable between a rearward position in which it receives mix from a hopper and a forward position, and discharging mix into a vertically disposed mold cavity during advance toward such forward position, and a formed-brick receiving surface in the line of movement of the charger forwardly of the mold cavity; the combination of brick gripping tongs including a pair of arms each extending along a side of said charger and projecting forwardly therefrom, each of said arms having a longitudinally extending cam slot therein; pins projecting from the sides of the charger and each engaged in a cam slot; means biasing the forward portions of said arms to engage the charger; toggle links connecting the rear ends of the arms to means fixed to said charger; and releasable latch means arranged to engage said tongs, during forward movement of said charger, to temporarily arrest corresponding motion of said tongs; said toggle links, responsive to such arrested movement of said tongs, spreading the rear ends of said arms to clamp the projecting forward arm portions onto a formed brick, and said pins moving along said cam slots to lift such forward arm portions; said latch means being releasable responsive to continued forward movement of said charger to provide for said tongs carrying the brick onto said receiving surface.

10. In apparatus for manufacturing pressed brick of the type including; a charger horizontally reciprocable between a rearward position in which it receives mix from a hopper and a forward position, and discharging mix into a vertically disposed mold cavity during advance toward such forward position, and a formed-brick receiving surface in the line of movement of the charger forwardly of the mold cavity; the combination of brick gripping tongs including a pair of arms each extending along a side of said charger and projecting forwardly therefrom, each of said arms having a longitudinally extending cam slot therein; pins projecting from the sides of the charger and each engaged in a cam slot; means biasing the forward portions of said arms to engage the charger; toggle links connecting the rear ends of the arms to means fixed to said charger; and releasable latch means arranged to engage said tongs, during forward and reverse movement of said charger, to temporarily arrest corresponding motion of said tongs; said toggle links, responsive to such arrested movement of said tongs during forward movement of said charger, spreading the rear ends of said arms to clamp the projecting forward arm portions onto a formed brick, and said pins moving along said cam slots to lift such forward arm portions; said latch means being releasable responsive to continued forward movement of said charger to provide for said tongs carrying the brick onto said receiving surface; said pins, responsive to such arrested movement of said tongs during reverse movement of said charger, riding along said cam slots to lower such forward arm portions, and said toggle links converging the rear ends of said arms to spread the projecting forward portions thereof to release the brick; said latch means being releasable responsive to continued reverse movement of said charger.

11. In apparatus for manufacturing pressed brick of the type including; a charger horizontally reciprocable along a supporting surface between a rearward position in which it receives mix from a hopper and a forward position, and discharging mix into a vertically disposed cavity during advance toward such forward position, and a formed-brick receiving surface in the line of movement of the charger forwardly of the mold cavity; the combination of brick gripping tongs including a pair of relatively flat arms each extending along a side of said charger in juxtaposed relation therewith and projecting forwardly therefrom, each arm having a horizontal slot intermediate its ends and a cam slot adjacent its forward end, and each cam slot including a horizontal portion continuous with a forwardly and downwardly sloping portion; a pair of pins projecting from each side of the charger, each pair being engaged in the slots of the juxtaposed arm; toggle links connecting the rear ends of the arms to means fixed to said charger; each arm having an outwardly projecting abutment thereon; a pair of spring means each secured at its rear end to the charger supporting surface and having its free forward end engaging and biasing the adjacent arm toward the charger, the free end of each spring being formed to engage the associated abutment to releasably arrest longitudinal movement of the tongs; said toggle links, responsive to such arrested movement of said tongs, spreading the rear ends of said arms to clamp the projecting forward arm portions onto a formed brick, and the forward pins moving along said cam slots lift such forward arm portions about the rearward pins as pivots; the spring ends riding over said abutments, as the pins engage the forward ends of the respective slots, to provide for said tongs carrying the brick onto said receiving surface.

12. In apparatus for manufacturing pressed brick of the type including; a charger horizontally reciprocable along a supporting surface between a rearward position in which it receives mix from a hopper and a forward position, and discharging mix into a vertically disposed cavity during advance toward such forward position, and a formed-brick receiving surface in the line of movement of the charger forwardly of the mold cavity; the combination of brick gripping tongs including a pair of relatively flat arms each extending along a side of said charger in juxtaposed relation therewith and projecting forwardly therefrom, each arm having a horizontal slot intermediate its ends and a cam slot adjacent its forward end, and each cam slot including a horizontal portion continuous with a forwardly and downwardly sloping portion; a pair of pins projecting from each side of the charger, each pair being engaged in the slots of the juxtaposed arm; toggle links connecting the rear ends of the arms to means fixed to said charger; each arm having an outwardly projecting abutment thereon; a pair of spring means each secured at its rear end to the charger supporting surface and having its free forward end engaging and biasing the adjacent arm toward the charger, the free end of each spring being formed to engage the associated abutment to releasably arrest longitudinal movement of the tongs; said toggle links, responsive to such arrested movement of said tongs during forward movement of said charger, spreading the rear ends of said arms to clamp the projecting forward arm portions onto a formed brick, and the forward pins moving along said cam slots to lift such forward arm portions about the rearward pins as pivots; the spring ends riding over and engaging behind said abutments, as the pins engage the forward ends of the respective slots, to provide for said tongs carrying the brick onto said receiving surface.

13. In apparatus for manufacturing pressed brick of the type including; a charger horizontally reciprocable along a supporting surface between a rearward position in which it receives mix from a hopper and a forward position, and discharging mix into a vertically disposed cavity during advance toward such forward position, and a formed-brick receiving surface in the line of movement of the charger forwardly of the mold cavity; the combination of brick gripping tongs including a pair of relatively flat arms each extending along a side of said charger in juxtaposed relation therewith and projecting forwardly therefrom, each arm having a horizontal slot intermediate its ends and a cam slot adjacent its forward end, and each cam slot including a horizontal portion continuous with a forwardly and downwardly sloping portion; the forward ends of said arms extending toward each other in front of the charger and terminating in spaced parallel brick engaging portions extending parallel to the line of movement of said charger; a pair of pins projecting from each side of the charger, each pair being engaged in the slots of the juxtaposed arm; toggle links connecting the rear ends of the arms to means fixed to said charger; each arm having an outwardly projecting abutment thereon; a pair of spring means each secured at its rear end to the charger supporting surface and having its free forward end engaging and biasing the adjacent arm toward the charger, the free end of each spring being formed to engage the associated abutment to releasably arrest longitudinal movement of the tongs; said toggle links, responsive to such arrested movement of said tongs, spreading the rear ends of said arms to clamp the projecting forward arm portions onto a formed brick, and the forward pins moving along said cam slots lift such forward arm portions about the rearward pins as pivots; the spring ends riding over said abutments, as the pins engage the forward ends of the respective slots, to provide for said tongs carrying the brick onto said receiving surface.

14. In apparatus for manufacturing pressed brick of the type including; a charger horizontally reciprocable along a supporting surface between a rearward position in which it receives mix from a hopper and a forward position, and discharging mix into a vertically disposed cavity during advance toward such forward position, and a formed-brick receiving surface in the line of movement of the charger forwardly of the mold cavity; the combination of brick gripping tongs including a pair of relatively flat arms each extending along a side of said charger in juxtaposed relation therewith and projecting forwardly therefrom, each arm having a horizontal slot intermediate its ends and a cam slot adjacent its forward end, and each cam slot including a horizontal portion continuous with a forwardly and downwardly sloping portion; the forward ends of said arms extending toward each other in front of the charger and terminating in spaced parallel brick engaging portions extending parallel to the line of movement of said charger; a pair of pins projecting from each side of the charger, each pair being engaged in the slots of the juxtaposed arm; toggle links connecting the rear ends of the arms to means fixed to said charger; each arm having an outwardly projecting abutment thereon; a pair of spring means each secured at its rear end to the charger supporting surface and having its free forward end engaging and biasing the adjacent arm toward the charger, the free end of each spring being formed to engage the associated abutment to releasably arrest longitudinal movement of the tongs; said toggle links, responsive to such arrested movement of said tongs during forward movement of said charger, spreading the rear ends of said arms to clamp the projecting forward arm portions onto a formed brick, and the forward pins moving along said cam slots to lift such forward arm portions about the rearward pins as pivots; the spring ends riding over and engaging behind said abutments, as the pins engage the forward ends of the respective slots, to provide for said tongs carrying the brick onto said receiving surface.

References Cited in the file of this patent

UNITED STATES PATENTS

| Number | Name | Date |
|---|---|---|
| 1,959,512 | Wall et al. | May 22, 1934 |
| 2,334,082 | Gates | Nov. 9, 1943 |
| 2,406,619 | List et al. | Aug. 27, 1946 |